(12) United States Patent
Takizawa et al.

(10) Patent No.: US 10,950,276 B2
(45) Date of Patent: Mar. 16, 2021

(54) APPARATUS AND METHOD TO DISPLAY EVENT INFORMATION DETECTED FROM VIDEO DATA

(71) Applicant: FUJITSU LIMITED, Kawasaki (JP)

(72) Inventors: Tomohiro Takizawa, Chigasaki (JP); Hiroto Motoyama, Meguro (JP); Kazuhiro Arima, Kawasaki (JP); Shinichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 16/292,935

(22) Filed: Mar. 5, 2019

(65) Prior Publication Data

US 2019/0304508 A1    Oct. 3, 2019

(30) Foreign Application Priority Data

Mar. 27, 2018    (JP) .............................. JP2018-060417

(51) Int. Cl.
| | | |
|---|---|---|
| *G11B 27/34* | (2006.01) | |
| *G11B 27/22* | (2006.01) | |
| *G11B 27/00* | (2006.01) | |
| *H04N 9/87* | (2006.01) | |
| *G06K 9/00* | (2006.01) | |

(52) U.S. Cl.
CPC .......... *G11B 27/34* (2013.01); *G06K 9/00724* (2013.01); *G11B 27/005* (2013.01); *G11B 27/22* (2013.01); *H04N 9/8715* (2013.01); *G06K 2009/00738* (2013.01)

(58) Field of Classification Search
CPC .. G11B 27/34; H04N 9/8715; G06K 9/00724; G06T 7/246
See application file for complete search history.

(56) References Cited

U.S. PATENT DOCUMENTS

| 2010/0194891 A1* | 8/2010 | Hikita | ................. G11B 27/105 348/157 |
| --- | --- | --- | --- |
| 2014/0245367 A1* | 8/2014 | Sasaki | ................ H04N 21/6175 725/109 |

FOREIGN PATENT DOCUMENTS

| JP | 2001-230993 | 8/2001 |
| --- | --- | --- |
| JP | 2006-312088 | 11/2006 |
| JP | 2009-153144 | 7/2009 |
| JP | 2010-183301 | 8/2010 |
| JP | 2015-070503 | 4/2015 |

* cited by examiner

*Primary Examiner* — Girumsew Wendmagegn
(74) *Attorney, Agent, or Firm* — Fujitsu Patent Center (57) ABSTRACT

Upon capture of video data for a match of a sport at a first time, an apparatus performs detection of event information from the captured video data during a first time-period starting from the first time, where the event information includes information identifying an occurrence timing of an event that occurs in the match of the sport, an event type of the event, and an occurrence position of the event. The apparatus reproduces the video data, on a display screen, with a delay by a second time-period obtained by adding a third time-period longer than or equal to a predetermined time-period to the first time-period, and, upon detection of the event information, continues displaying the event type and the occurrence position of the event, for the predetermined time-period, from a timing that is the predetermined time before the occurrence timing of the event within the reproduced video data.

9 Claims, 11 Drawing Sheets

| CAMERA ID | VIDEO DATA |
|---|---|
| K10a | VIDEO DATA CAPTURED BY CAMERA 10a |
| K10b | VIDEO DATA CAPTURED BY CAMERA 10b |
| K10c | VIDEO DATA CAPTURED BY CAMERA 10c |
| ... | ... |

| TRACKING ID | TIME | TYPE | COORDINATES |
|---|---|---|---|
| o1 | $t_1$ | PLAYER | $(x_{o11}, y_{o11}, z_{o11})$ |
| | $t_2$ | PLAYER | $(x_{o12}, y_{o12}, z_{o12})$ |
| | $t_3$ | PLAYER | $(x_{o13}, y_{o13}, z_{o13})$ |
| | ... | | |
| o2 | $t_1$ | PLAYER | $(x_{o21}, y_{o21}, z_{o21})$ |
| | $t_2$ | PLAYER | $(x_{o22}, y_{o22}, z_{o22})$ |
| | $t_3$ | PLAYER | $(x_{o23}, y_{o23}, z_{o23})$ |
| | ... | | |
| o3 | $t_1$ | PLAYER | $(x_{o31}, y_{o31}, z_{o31})$ |
| | $t_2$ | PLAYER | $(x_{o32}, y_{o32}, z_{o32})$ |
| | $t_3$ | PLAYER | $(x_{o33}, y_{o33}, z_{o33})$ |
| | ... | | |
| ... | | | |

| ASSOCIATED TIME | TRACKING ID | PLAYER COLOR | UNIFORM NUMBER |
|---|---|---|---|
| $t_{10}$ | o1 | red | 1 |
| $t_{10}$ | o2 | blue | 2 |
| $t_{20}$ | o1 | red | 1 |
| ... | ... | ... | ... |

FIG. 7

| SERIAL NUMBER | EVENT TYPE | TRACKING ID | PLAYER COLOR | UNIFORM NUMBER | TIME | COORDINATES |
|---|---|---|---|---|---|---|
| s1 | 2-POINT SHOT FAILURE | o1 | red | 8 | $t_{11}$ | $(x_{o111}, y_{o111}, z_{o111})$ |
| s2 | DEFENSE REBOUND | o2 | blue | 2 | $t_{21}$ | $(x_{o221}, y_{o221}, z_{o221})$ |
| s3 | 3-POINT SHOT SUCCESS | o4 | blue | 3 | $t_{31}$ | $(x_{o431}, y_{o431}, z_{o431})$ |
| s4 | THROW-IN | o1 | red | 1 | $t_{41}$ | $(x_{o141}, y_{o141}, z_{o141})$ |
| ... | ... | ... | ... | ... | ... | ... |

APPARATUS AND METHOD TO DISPLAY EVENT INFORMATION DETECTED FROM VIDEO DATA

CROSS-REFERENCE TO RELATED APPLICATION

This application is based upon and claims the benefit of priority of the prior Japanese Patent Application No. 2018-60417, filed on Mar. 27, 2018, the entire contents of which are incorporated herein by reference.

FIELD

The embodiments discussed herein are related to apparatus and method to display event information detected from video data.

BACKGROUND

Up to now, play contents of respective players are recorded as stats information in a sport match. For example, in a basketball match, an operator directly visually observes the match or refers to match video to check events such as passes, shots, goals, and rebounds performed by the respective players and inputs and records the checked contents into a computer as the stats information.

A related-art technology for identifying a particular event from the match video has been proposed, and a related-art technology for automatically generating the stats information by using the above-mentioned technology has also been proposed.

CITATION LIST

Patent Literature

[1] Japanese Laid-open Patent Publication No. 2006-312088
[2] Japanese Laid-open Patent Publication No. 2010-183301
[3] Japanese Laid-open Patent Publication No. 2015-070503
[4] Japanese Laid-open Patent Publication No. 2001-230993
[5] Japanese Laid-open Patent Publication No. 2009-153144

SUMMARY

According to an aspect of the embodiments, upon capture of video data for a match of a sport at a first time, an apparatus performs detection of event information from the captured video data during a first time-period starting from the first time, where the event information includes information identifying an occurrence timing of an event that occurs in the match of the sport, an event type of the event, and an occurrence position of the event. The apparatus reproduces the video data, on a display screen, with a delay by a second time-period obtained by adding a third time-period longer than or equal to a predetermined time-period to the first time-period, and, upon detection of the event information, continues displaying the event type and area information indicating the occurrence position of the event, on the display screen, for the predetermined time-period, from a timing that is the predetermined time before the occurrence timing of the event within the reproduced video data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The event detected by the computer that uses the related-art technology is different from an event that has actually occurred in some cases. That is, for example, an erroneous detection occurs in some cases. Thus, the stats information is not appropriately generated in some cases. For this reason, the operator visually compares the stats information automatically generated by the computer with the match video and determines whether or not the stats information is appropriate. For example, in a case where the automatically generated stats information is correct, the operator records the stats information as it is. On the other hand, in a case where the automatically generated stats information is incorrect, the operator corrects the stats information and records the corrected stats information.

A processing time for the computer to detect an event is, for example, several tens of seconds after the video is input. A delay of several tens of seconds occurs since the event has actually occurred until a detection result of the event is output. For example, when the video is reproduced in real time, the event detected by the related-art technology is displayed after the event has occurred on the video, and it is difficult for the operator to check the event. For this reason, instead of reproducing the match video in real time on a check screen of the operator, a mode is conceivable in which the event detected by the related-art technology and the match video are synchronized with each other by delaying the reproduction of the match video by several tens of seconds which is spent by the detection processing.

However, according to the above-mentioned mode, an issue arises that an operability for the check operation is not improved.

It is preferable to improve the operability for the check operation.

Hereinafter, a display program, a display method, and a display device according to embodiments disclosed in the present application will be described in detail with reference to the drawings. This disclosure is not intended to be limited by the embodiments.

Figure 1:
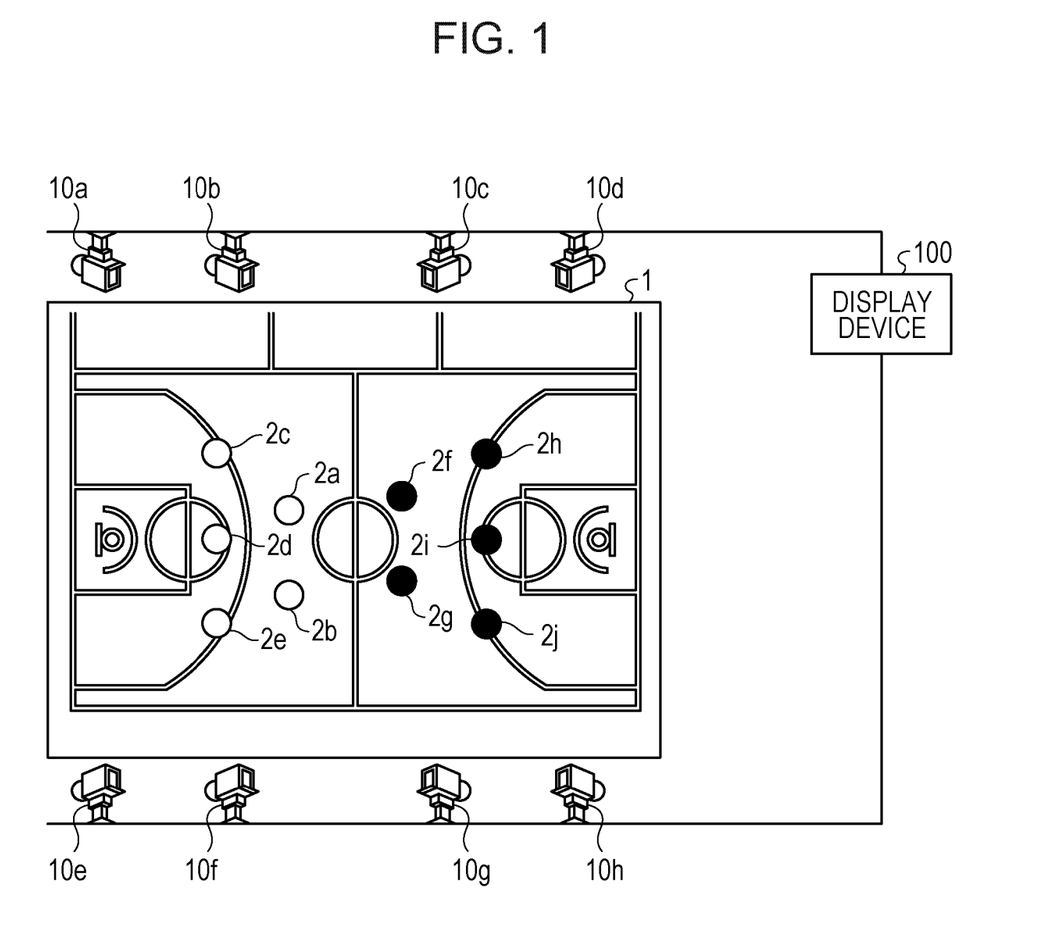
FIG. 1 illustrates a configuration of a system according to the present embodiment.

FIG. 1 illustrates a configuration of a system according to the embodiment. As illustrated in FIG. 1, this system includes cameras $10a$ to $10h$ and a display device 100.

This system may also include cameras other than the cameras $10a$ to $10h$. In the following descriptions, the cameras $10a$ to $10h$ will be appropriately collectively referred to as the camera 10. The camera 10 is coupled to the display device 100.

Players $2a$ to $2j$ play sport in a court 1. In the following descriptions, the players $2a$ to $2j$ will be appropriately collectively referred to as the player 2. According to the embodiment, a case where the players 2 play a basketball match in the court 1 will be described, but the case is not limited to this. For example, the embodiment may also be applied to soccer, volleyball, baseball, track and field competitions, dance, and the like in addition to basketball.

The camera 10 is a camera that outputs video data in a capturing range which is captured at predetermined frames per second (FPS) to the display device 100. This video data is video data of a match played by the players 2. A camera identifier (ID) for uniquely identifying the camera 10 that has captured the video data and information of times in respective frames are added to the video data.

The display device 100 is a device that analyzes the video data obtained from the camera 10 to detect an event that has occurred during the match and displays information of the detected event and the video data. A time spent for the display device 100 to detect the occurrence of the event will be referred to as an "analysis time". The display device 100 performs processing for reproducing the video data with delay by a "delay time" obtained by adding the analysis time to a prediction time and previously displaying the information of the event before the event occurs on the video data (earlier by the prediction time).

Figure 2:
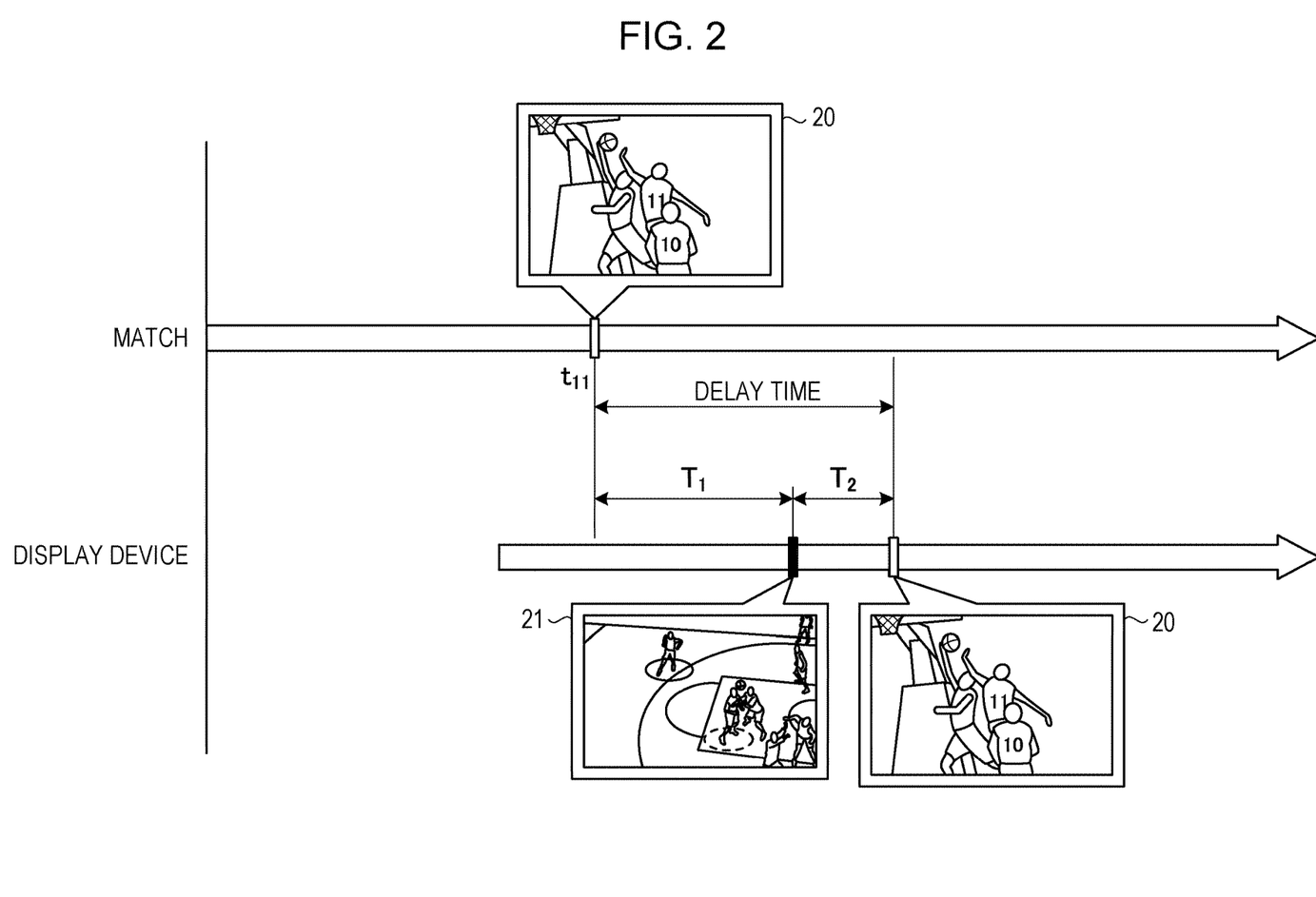
FIG. 2 is an explanatory diagram for describing an example of processing of a display device according to the present embodiment.

FIG. 2 is an explanatory diagram for describing an example of processing of the display device according to the embodiment. In the example illustrated in FIG. 2, an event 20 occurs at a time $t_{11}$ during the match. For example, the event 20 that has occurred is set as "a player with a uniform number 8 has failed a 2-point shot".

When the analysis time for the video data by the display device 100 is set as "$T_1$" and the prediction time is set as "$T_2$", the delay time corresponds to "$T_1+T_2$". The display device 100 performs the reproduction of the video data with the delay by the delay time "$T_1+T_2$" from the time $t_{11}$ when the event 20 has actually occurs. In a case where the reproduction of the video data is performed with the delay by the delay time "$T_1+T_2$", the display device 100 starts display of the information of the event 21 corresponding to an analysis result at a time point when the analysis time $T_1$ has elapsed from the time $t_{11}$. For example, the information of the event displayed by the display device 100 during a period from the time $t_{11}+T_1$ until the time $t_{11}+T_1+T_2$ includes an event type, an occurrence position of the event, and the like.

As described above, when the display device 100 according to the embodiment is used, the information of the event is displayed for an operator in advance during the period from the time $t_{11}+T_1$ until the time $t_{11}+T_1+T_2$, and the event 20 is displayed by using the video data at a time point when the delay time "$T_1+T_2$" has elapsed from the time $t_{11}$. For this reason, since the operator may find which event is to occur in advance, it is facilitated to check whether or not the information of the event which is automatically determined by the display device 100 is appropriate. That is, for example, the operability for the check operation may be improved.

Figure 3:
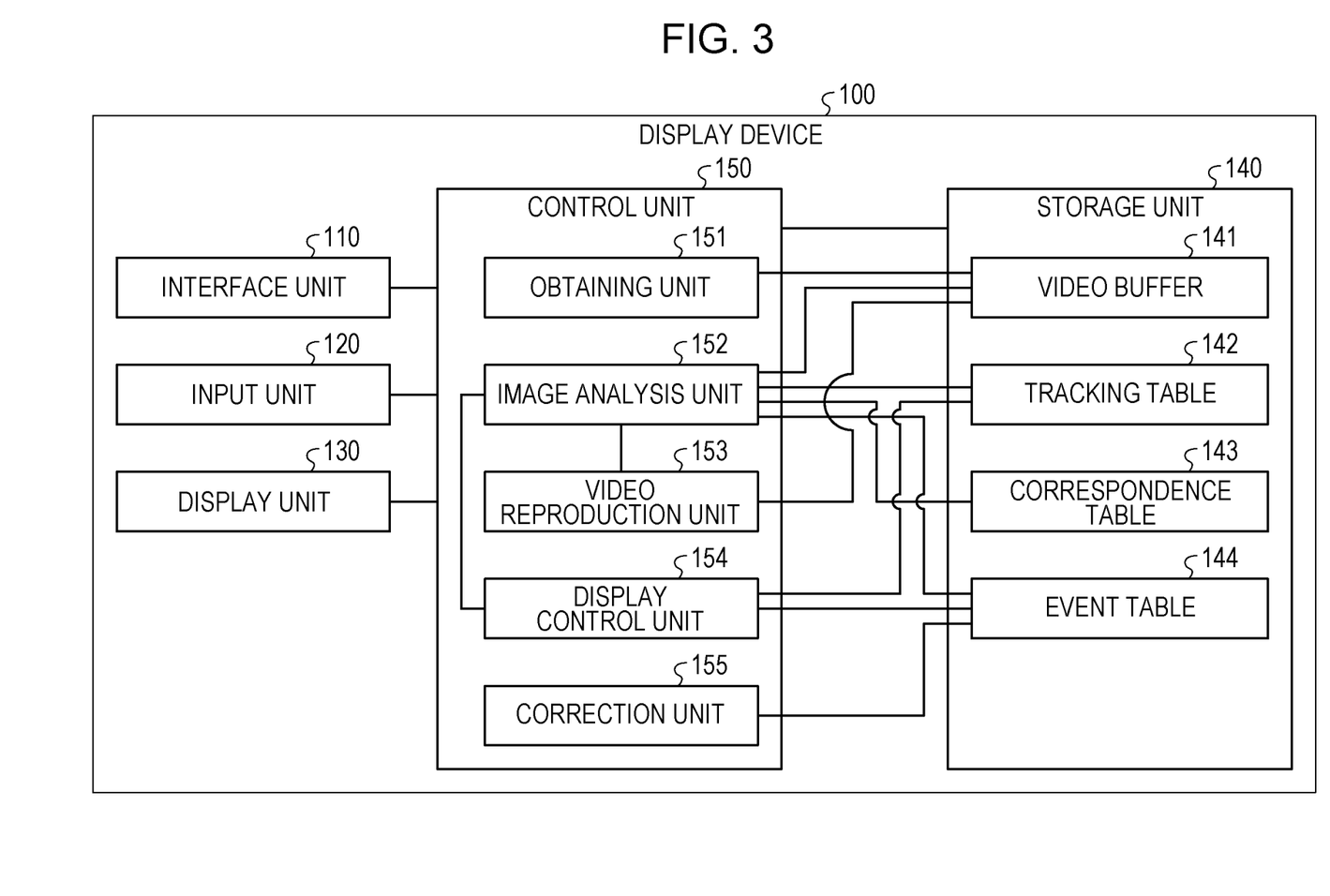
FIG. 3 is a functional block diagram illustrating a configuration of the display device according to the present embodiment.

Next, an example of a configuration of the display device 100 illustrated in FIG. 1 will be described. FIG. 3 is a function block diagram illustrating a configuration of the display device according to the embodiment. As illustrated in FIG. 3, the display device 100 includes an interface unit 110, an input unit 120, a display unit 130, a storage unit 140, and a control unit 150.

The interface unit 110 is an interface that accepts an input of the video data from the camera 10. The interface unit 110 outputs the video data accepted from the camera 10 to the control unit 150.

The input unit 120 is an input device that inputs various information to the display device 100. The input unit 120 corresponds to a key board, a mouse, a touch panel, or the like.

The display unit 130 is a device that displays the information of the event or the video data output from the control unit 150. The display unit 130 corresponds to a liquid crystal display, a touch panel, or the like.

The operator refers to the information of the event which is displayed on the display unit 130 and visually compares the information with the video data to check whether or not the information of the event is appropriate. In a case where it is determined that the information of the event is not appropriate, the operator operates the input unit 120 to correct the information of the event. On the other hand, in a case where the information of the event is appropriate, the operator does not correct the event.

The storage unit 140 includes a video buffer 141, a tracking table 142, a correspondence table 143, and an event table 144. The storage unit 140 corresponds to a semiconductor memory element such as a random access memory (RAM), a read only memory (ROM), or a flash memory or a storage device such as a hard disk drive (HDD).

Figure 4:
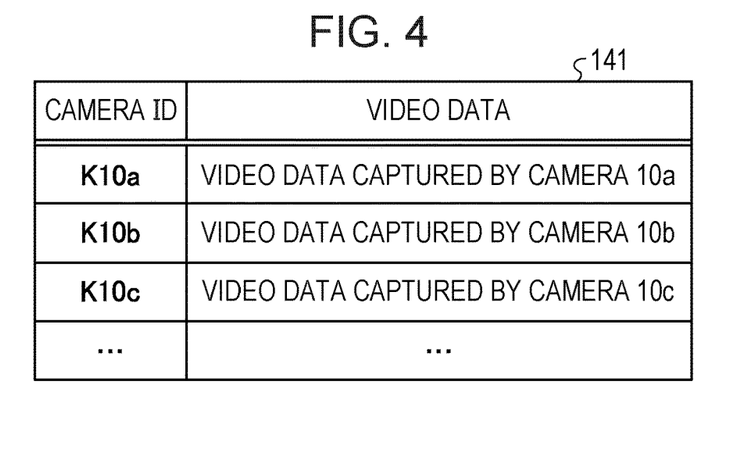
FIG. 4 illustrates an example of a data structure of a video buffer.

The video buffer 141 is a buffer that holds the video data captured by the camera 10. FIG. 4 illustrates an example of a data structure of a video buffer. As illustrated in FIG. 4, the video buffer associates an camera identifier (ID) with the video data. The camera ID is information that uniquely identifies the camera 10. For example, the camera IDs respectively corresponding to the cameras $10a$ to $10h$ are set as camera IDs "$K10a$ to $K10h$". The video data is video data of a match captured by the relevant cameras.

Figure 5:
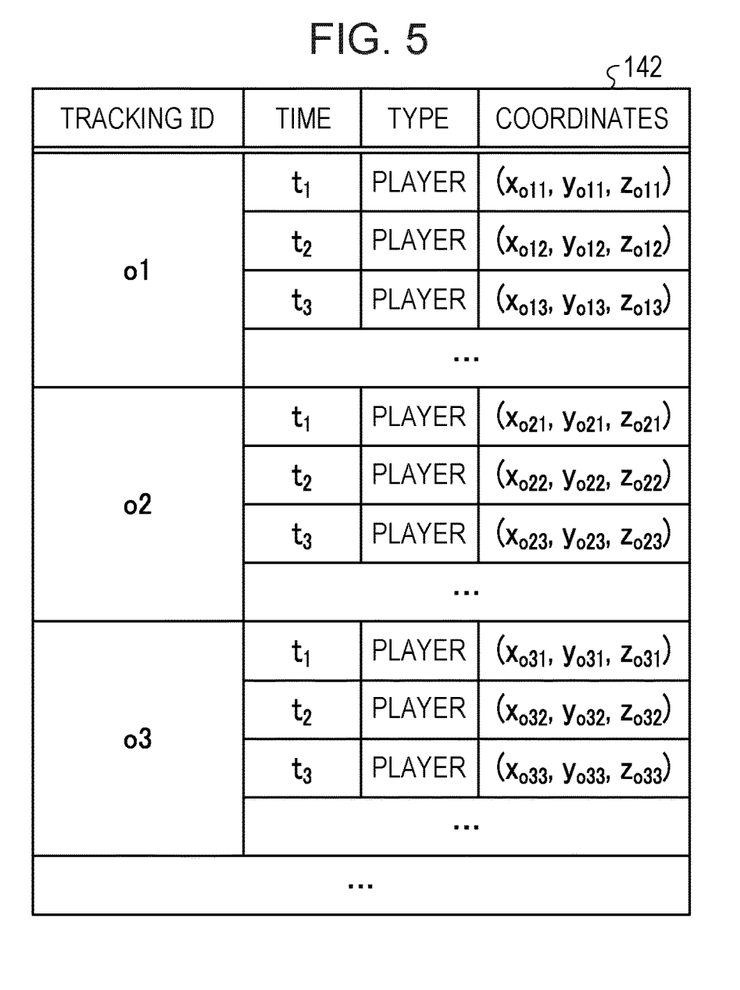
FIG. 5 illustrates an example of a data structure of a tracking table.

The tracking table 142 is a table that holds information of positional coordinates (movement trajectory) at respective times with regard to the player 2 or a ball used in the match. FIG. 5 illustrates an example of a data structure of the tracking table. As illustrated in FIG. 5, the tracking table 142 associates a tracking ID, a time, a type, and coordinates with one another. The tracking ID is information for uniquely identifying the movement trajectory of the series of player or ball identified by the time and the coordinates. The time indicates a time when the coordinates of the player 2 or the ball are detected. The type is information indicating whether the trajectory identified by the tracking ID is the trajectory of the player 2 or the trajectory of the ball. The coordinates indicate three-dimensional coordinates of the player 2 or the ball. For example, coordinates in an x-axis direction indicate coordinates in a short side direction of the court 1. Coordinates in a y-axis direction indicate coordinates in a long side direction of the court 1. Coordinates in a z-axis direction indicate coordinates in a vertical direction of the court 1.

In FIG. 5, coordinates (trajectory) of the "player" which is identified by a tracking ID "o1" indicate movements onto coordinates "$(x_{o11}, y_{o11}, z_{o11}), (x_{o12}, y_{o12}, z_{o12}), (x_{o13}, y_{o13}, z_{o13})$," at respective times "$t_1, t_2, t_3, \ldots$".

Figure 6:
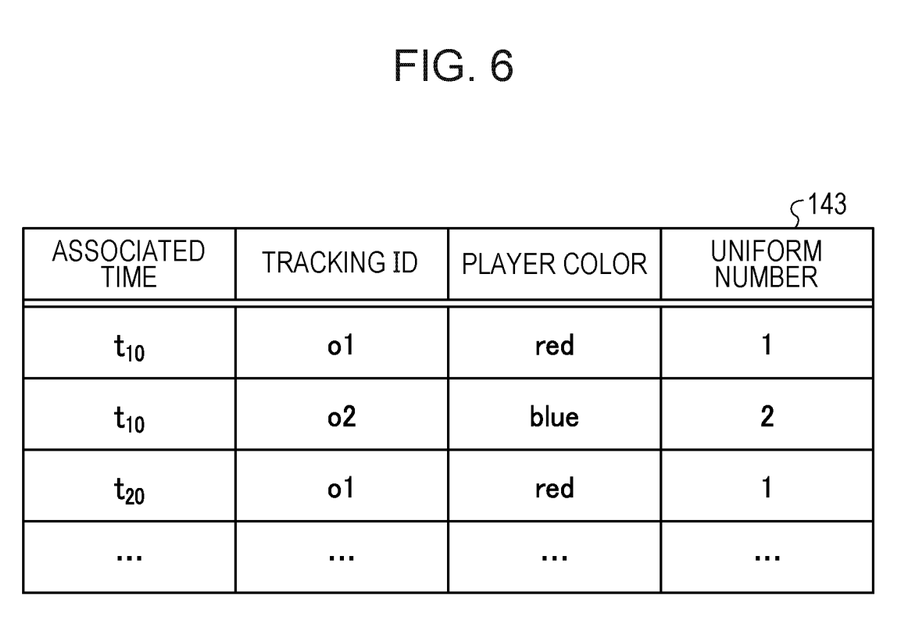
FIG. 6 illustrates an example of a data structure of a correspondence table.

The correspondence table 143 is a table that associates the information of the player 2 with the information of the tracking table illustrated in FIG. 5. FIG. 6 illustrates an example of a data structure of the correspondence table. As illustrated in FIG. 6, the correspondence table 143 associates an associated time, the tracking ID, a player color, and a uniform number with one another. The associated time is a time when the player and the tracking ID are associated (linked) with each other. The tracking ID corresponds to the tracking ID described with reference to FIG. 5. The player color indicates a color of a uniform on the player 2. The uniform number indicates a uniform number of the player 2. A set of the player color and the uniform number uniquely identifies the player 2.

For example, FIG. 6 illustrates that the player 2 having the player color "red" and the uniform number "1" is positioned at the coordinates at the time "$t_{10}$" with the tracking ID "o1" at the associated time "$t_{10}$".

Figure 7:
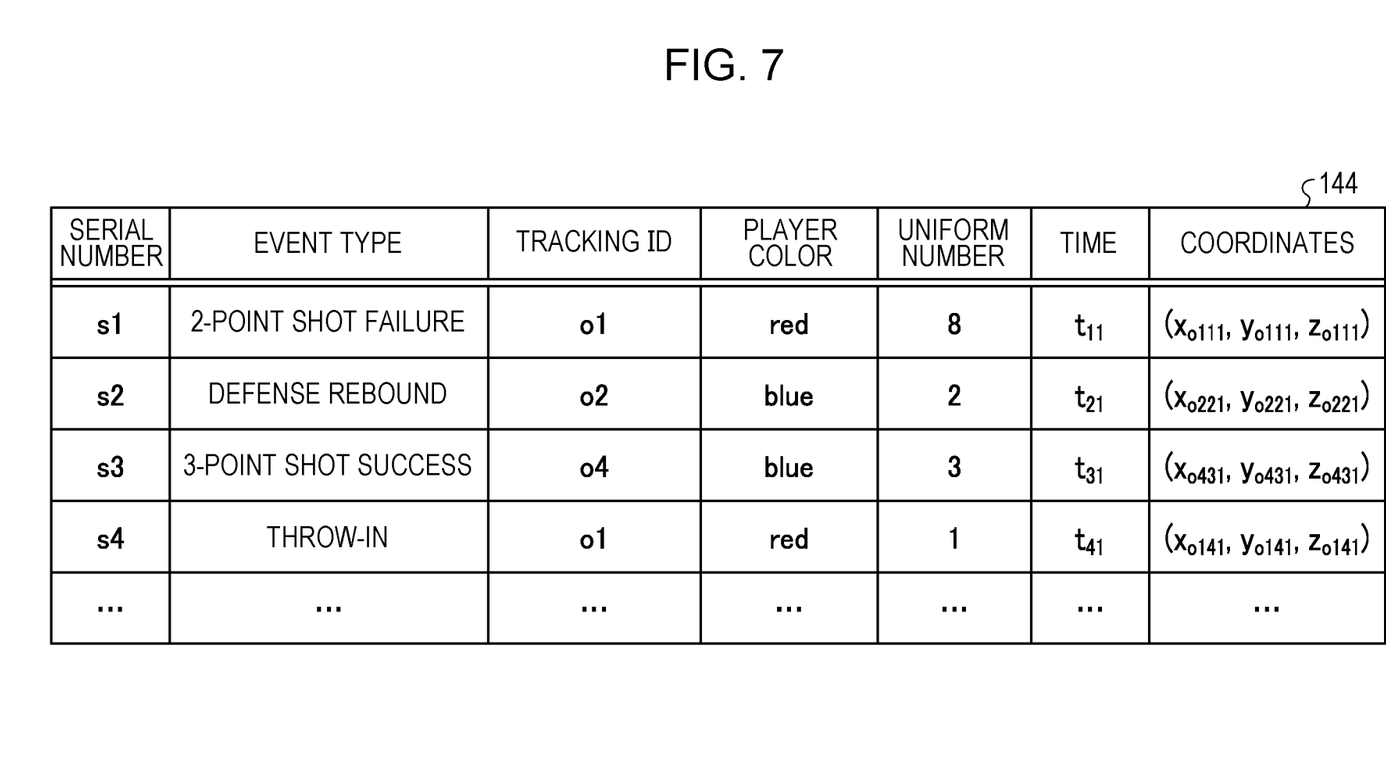
FIG. 7 illustrates an example of a data structure of an event table.

The event table 144 is a table that holds various information with regard to the event detected from the video data. FIG. 7 illustrates an example of a data structure of the event table. As illustrated in FIG. 7, the event table 144 associates a serial number, an event type, the tracking ID, the player color, the uniform number, a time, and coordinates with one another. The serial number indicates an order of the occurrence of the events. The event type indicates a type of the event. The descriptions with regard to the tracking ID, the player color, and the uniform number are similar to the descriptions with regard to the tracking ID, the player color, and the uniform number in FIG. 6. The time indicates a time when the event has occurred. The coordinates indicate an occurrence position of the event.

The descriptions will be provided with reference to FIG. 3 again. The control unit 150 includes an obtaining unit 151, an image analysis unit 152, a video reproduction unit 153, a display control unit 154, and a correction unit 155. The control unit 150 may be realized by a central processing unit (CPU), a micro processing unit (MPU), or the like. The control unit 150 may also be realized by a hard wired logic such as an application specific integrated circuit (ASIC) or a field programmable gate array (FPGA).

The obtaining unit 151 is a processing unit that obtains the video data from the camera 10 via the interface unit 110. The obtaining unit 151 refers to the camera ID to which the video data is added and stores the video data in an area corresponding to the camera ID of the video buffer 141.

The image analysis unit 152 is a processing unit that generates the tracking table 142, the correspondence table 143, the event table 144 by analyzing the video data stored in the video buffer 141. The image analysis unit 152 analyzes the video data and outputs the information of the analysis time until the information of the event is generated to the video reproduction unit 153 and the display control unit 154.

An example of the processing for the image analysis unit 152 to generate the tracking table 142 and the correspondence table 143 will be described. The image analysis unit 152 detects feature parts (such as a color and a shape) of the player 2 from a frame of the video data stored in the video buffer 141 and calculates the three-dimensional coordinates of the player 2 based on a principle of a stereo camera (trigonometrical survey) by the two cameras 10. The image analysis unit 152 registers the information in which the tracking ID, the time, the type "player", and the coordinates are associated with one another in the tracking table 142. The image analysis unit 152 registers the information in which the associated time, the tracking ID, the player color, and the uniform number are associated with one another in the correspondence table 143.

The image analysis unit 152 detects feature parts (such as a color and a shape) of the ball from the frame of the video data stored in the video buffer 141 and calculates the three-dimensional coordinates of the ball based on the principle of the stereo camera by the two cameras 10. The image analysis unit 152 registers the information in which the tracking ID, the time, the type "ball", and the coordinates are associated with one another in the tracking table 142.

The image analysis unit 152 may also generate the tracking table 142 and the correspondence table 143 by using other technologies. For example, a sensor that generates a signal is mounted to the player 2 or the ball in advance, and the image analysis unit 152 may also calculate the three-dimensional coordinates of the player 2 or the ball by using a plurality of receivers (not illustrated) that receives the above-mentioned signal. The image analysis unit 152 may also receive tracking data from an external tracking system (not illustrated) that generates the tracking data of the player 2 or the ball and register the information in the tracking table 142 and the correspondence table 143.

An example of processing for the image analysis unit 152 to generate the event table 144 will be described. The image analysis unit 152 performs various event detections based on the coordinates of the player and combinations of areas through which the ball passes illustrated in the tracking table 142. For example, the image analysis unit 152 detects an occurrence of an event type "3-point shot success" in a case where the ball away from the player 2 at a position, whose distance from a basket goal is greater than or equal to a threshold, passes through a predetermined area (basket goal). The image analysis unit 152 registers the serial number, the event type, the tracking ID, the player color, the uniform number, the time, and the coordinates in the event table 144 in association with each other.

Pieces of information related to respective lines on the court 1 and the position of the basket goal are previously stored in the storage unit 140. The image analysis unit 152 may also generate the event table 144 by using other technologies. The image analysis unit 152 may also receive the information of the event from the external tracking system (not illustrated) that detects the event type to be registered in the event table 144.

The image analysis unit 152 may also performs the tracking of the player or the ball or the detection of the event occurrence by using the technologies described in Japanese Laid-open Patent Publication No. 2006-312088, 2010-183301, Japanese Laid-open Patent Publication No. 2015-070503, and the like.

The image analysis unit 152 outputs the information of the analysis time spent for generating the information of the event, by analyzing the video buffer 141, to the video reproduction unit 153 and the display control unit 154. When the information of the respective events is generated, the image analysis unit 152 may also calculate an average analysis time until the information of the event is generated and update the analysis time output to the video reproduction unit 153 by this average analysis time. In a case where the information of the event is received from the external tracking system, the image analysis unit 152 beforehand obtains the analysis time spent for the above-mentioned external tracking system to generate the information of the event, and outputs the above-mentioned analysis time to the video reproduction unit 153 and the display control unit 154.

The video reproduction unit 153 is a processing unit that reproduces the video data by outputting the video data stored in the video buffer 141 to the display unit 130. In a case where the video data is reproduced, the video reproduction unit 153 previously calculates a delay time obtained by adding the analysis time to the prediction time. The analysis time is a time received from the image analysis unit 152. The prediction time is a time beforehand set by the operator via the input unit 120 or the like.

For example, when the information of the event is registered in the event table 144, the video reproduction unit 153 reproduces the video data with delay by the delay time from the time when the video data stored in the video buffer 141 is captured by the camera 10.

The video reproduction unit 153 may reproduce the respective pieces of video data captured by the respective cameras or may also reproduce the video data captured by the camera 10 specified by the operator via the input unit 120. The video data output from the video reproduction unit 153 is displayed in part of a display screen generated by the display control unit 154 which will be described below.

The display control unit 154 is a processing unit that outputs the information of the event stored in the event table 144 to the display unit 130 to be displayed. For example, when the information of the event is registered in the event table 144, the display control unit 154 causes the display unit 130 to display the information of the event during the prediction time after the delay time has elapsed from the time when the event has occurred.

For example, in a case where the event type "2-point shot failure" has occurred at the time "$t_{11}$" as illustrated in the serial number "s1" in the event table 144 of FIG. 7, the display control unit 154 causes the display unit 130 to continue displaying the information of the event during a period from the time $t_{11}$+the delay time to the time $t_{11}$+the delay time+the prediction time. The information of the event includes, for example, the event type, the information of the player 2 related to the event, and the coordinates where the event has occurred.

Figure 8:
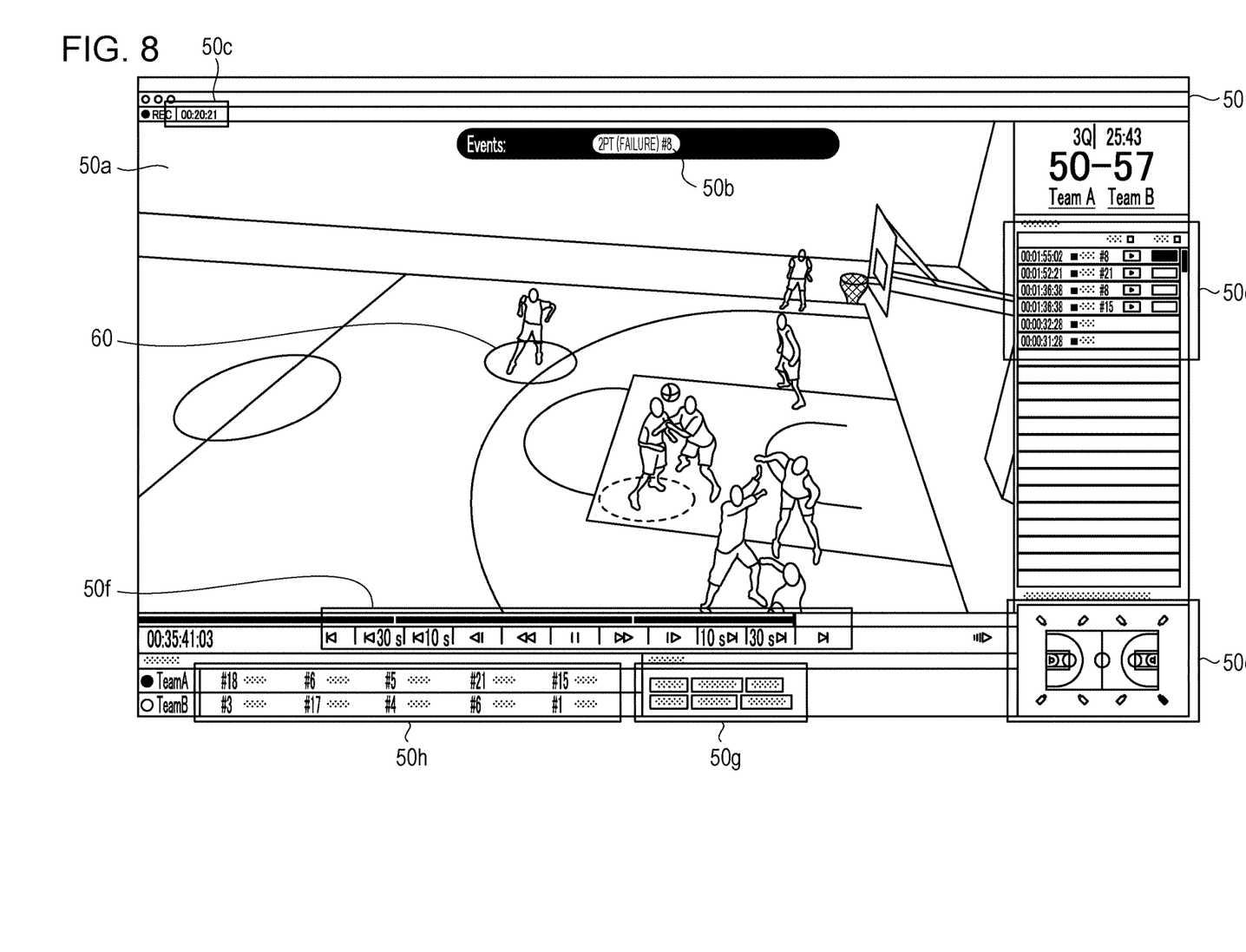
FIG. 8 illustrates an example of a display screen.

FIG. 8 illustrates an example of a display screen. The display control unit 154 generates information for a display screen 50 illustrated in FIG. 8 and causes the display unit 130 to display the information. For example, the display screen 50 includes areas 50a to 50h. The area 50a is an area where the video data output by the video reproduction unit 153 is displayed with the delay by the delay time.

The area 50b is an area where the event type and the information of the player who performs the event are displayed. In the example illustrated in FIG. 8, information indicating that the player 2 having the uniform number "8" "fails the 2-point shot" is displayed.

The area 50c is an area where the delay time is displayed. The area 50d is an area where the information of the event that has occurred in the past is displayed. The area 50e is an area where a position of the currently selected camera is displayed. The area 50f is an area where various operation buttons such as stop, play, fast-forward, and fast-rewind are displayed. The area 50g is an area where various short cuts are displayed. The area 50h is an area where list information of the players 2 who participate the match is displayed.

The coordinates where an event is to occur are displayed by a prediction circle 60 in the area 50a in FIG. 8. For example, the display control unit 154 includes a coordinate conversion table corresponding to the camera. The display control unit 154 compares the coordinate conversion table with the coordinates where the event has occurred to calculate the coordinates where the event is to occur on the area 50a and displays the prediction circle 60 at the relevant position.

The display control unit 154 may continue displaying the prediction circle 60 at the position where the event is to occur or may also move the prediction circle 60 in accordance with the movement trajectory of the player who causes the event during the prediction time. The display control unit 154 compares the tracking ID of the relevant event type in the event table 144 with the tracking table 142 to identify the movement trajectory (coordinates) at the respective times and moves the prediction circle 60.

The operator refers to the display screen 50 displayed on the display unit 130 and determines whether or not the information of the event displayed in the area 50a is appropriate. In a case where it is determined that the information of the event is not appropriate, the operator operates the input unit 120 and corrects the information of the event displayed in the area 50b.

The correction unit 155 is a processing unit that corrects the event information in the event table 144 in accordance with the correction input from the input unit 120. For example, a case is considered where the information indicating that the player 2 having the uniform number "8" "fails the 2-point shot" is displayed in the area 50b, and the correction indicating that the player 2 having the uniform number "8" "succeeds the 2-point shot" is accepted. In this case, the correction unit 155 corrects "2-point shot failure" into "2-point shot success" in the event table 144.

Figure 9:
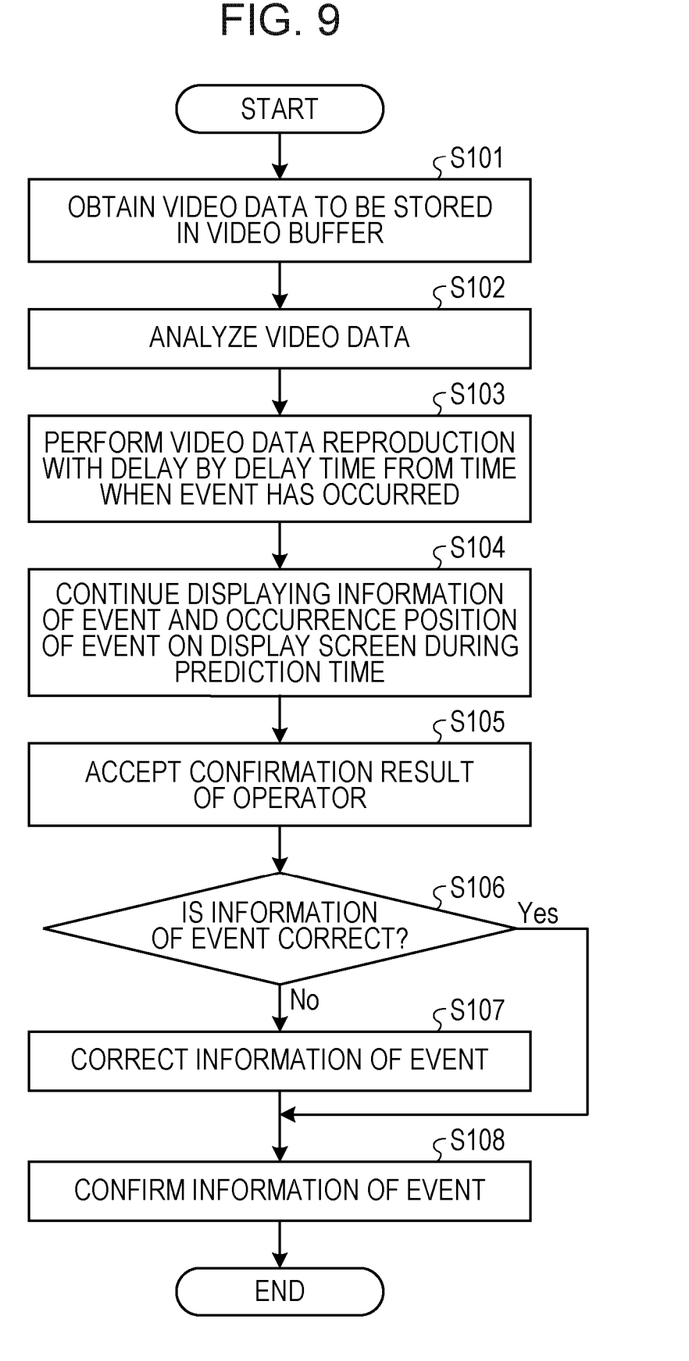
FIG. 9 is a flow chart illustrating a processing procedure of the display device according to the present embodiment.

Next, an example of a processing procedure of the display device 100 according to the present embodiment will be described. FIG. 9 is a flowchart illustrating the processing procedure of the display device according to the embodiment. As illustrated in FIG. 9, the obtaining unit 151 of the display device 100 obtains the video data from the camera 10 to be stored in the video buffer 141 (step S101).

The image analysis unit 152 of the display device 100 analyzes the video data stored in the video buffer 141 (step S102). The video reproduction unit 153 of the display device 100 reproduces the video data with the delay by the delay time from the time when the event has occurred (step S103).

The display control unit 154 of the display device 100 continues displaying the information of the event and the occurrence position of the event on the display screen during the prediction time (step S104). The correction unit 155 of the display device 100 accepts the check result of the operator (step S105).

In a case where a check result indicating that the information of the event is correct is accepted (step S106, Yes), the correction unit 155 shifts to step S108. In a case where a check result indicating that the information of the event is not correct is accepted (step S106, No), the correction unit 155 corrects the information of the event in the event table 144 (step S107). The correction unit 155 confirms the information of the event of the event table 144 (step S108).

Next, advantages of the display device 100 according to the embodiment will be described. The display device 100 performs processing for reproducing the video data with the delay by the delay time obtained by adding the prediction time to the analysis time of the video data and displaying the information of the event in advance before the event occurs in the video data. With this configuration, since the operator may, in advance, find which event is to occur, it is facilitated to check whether or not the information of the event which is automatically determined by the display device 100 is appropriate. That is, for example, the operability for the check operation may be improved.

The above-mentioned processing of the display device 100 is an example, and the display device 100 may also perform other processing. Hereinafter, other processing 1, other processing 2, and other processing 3 performed by the display device 100 will be described.

The other processing 1 performed by the display device 100 will be described. The video reproduction unit 153 and the display control unit 154 of the display device 100 may also perform processing for adjusting the prediction time in accordance with the event type. For example, the event types include an event type in which the operator easily determines whether or not the event type is appropriate and an event type in which it is difficult for the operator to determine whether or not the event type is appropriate. With regard to the event type with the difficulty on the determination, the prediction time may be lengthened in some cases.

The video reproduction unit 153 and the display control unit 154 distinguish the event types in the event table 144 into the event type with the ease on the determination and the event type with the difficulty on the determination. The video reproduction unit 153 and the display control unit 154 set the prediction time with regard to the event type with the ease on the determination as the previously set prediction time. On the other hand, the video reproduction unit 153 and the display control unit 154 set the prediction time with regard to the event type with the difficulty on the determination to be longer than the prediction time with regard to the event type with the ease on the determination. The operator previously sets how much the prediction time is to be lengthened.

For example, defense rebound, offense rebound, and the like among the event types are events where many of the players 2 complete against each other and therefore events with the difficulty on the determination where the event type is difficult to determine. In contrast to this, events such as the 3-point shot are events where many of the players 2 hardly complete against each other and therefore events with the ease on the determination where the event type is easy to determine.

The other processing 2 performed by the display device 100 will be described. In a case where the prediction circle is displayed, the display control unit 154 of the display device 100 may change a representation pattern of the prediction circle at the prediction time as the time approaches the occurrence time (occurrence timing) of the event. According to the embodiment, the descriptions based on the occurrence time of the event will be provided as an example, but the processing may also be performed based on a relative occurrence timing of the event from a time point of the start of the match instead of the occurrence time of the event.

Figure 10:
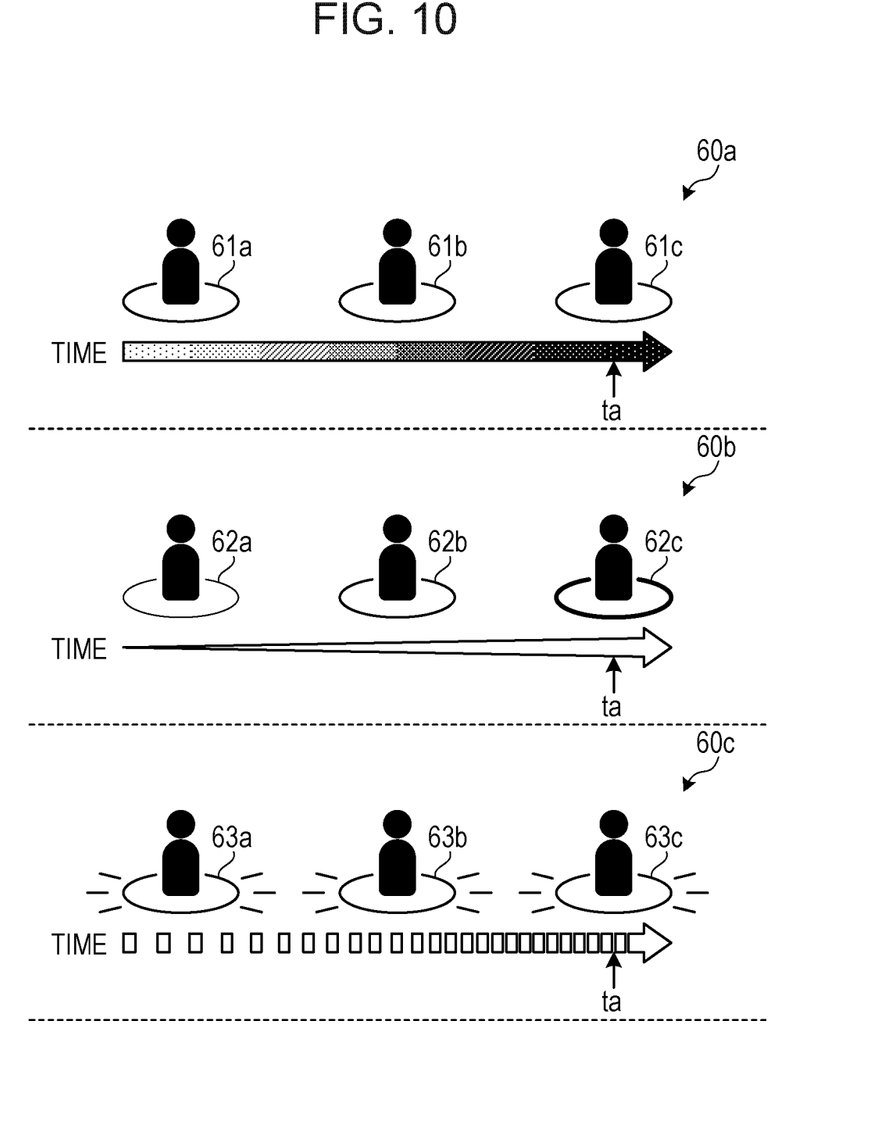
FIG. 10 illustrates an example of a display pattern of a prediction circle.

FIG. 10 illustrates an example of the representation pattern of the prediction circle. In the example illustrated in FIG. 10, representation patterns 60a, 60b, and 60c are illustrated. According to the representation pattern 60a, the display control unit 154 changes shading of the prediction circle as the time approaches an event occurrence time ta. For example, the display control unit 154 changes the prediction circle in the order of prediction circles 61a, 61b, and 61c. The prediction circle 61c is a prediction circle darker than the prediction circle 61b. The prediction circle 61b is a prediction circle darker than the prediction circle 61a.

According to the representation pattern 60b, as the time approaches the event occurrence time ta, the display control unit 154 changes a thickness of a line of the prediction circle. For example, the display control unit 154 changes the prediction circle in the order of prediction circles 62a, 62b, and 62c. The line of the prediction circle 62c is thicker than the line of the prediction circle 62b. The line of the prediction circle 62b is thicker than the line of the prediction circle 62c.

According to the representation pattern 60c, as the time approaches the event occurrence time ta, the display control unit 154 changes a flashing interval of the prediction circle. For example, the display control unit 154 changes the prediction circle in the order of prediction circles 63a, 63b, and 63c. The flashing interval of the prediction circle 63c is narrower than the flashing interval of the prediction circle 63b. The flashing interval of the prediction circle 63b is narrower than the flashing interval of the prediction circle 63a.

As described above, when the display device 100 changes the representation pattern of the prediction circle as the time approaches the occurrence time of the event, it becomes easier to find the timing when the event occurs in the video data.

Figure 11:
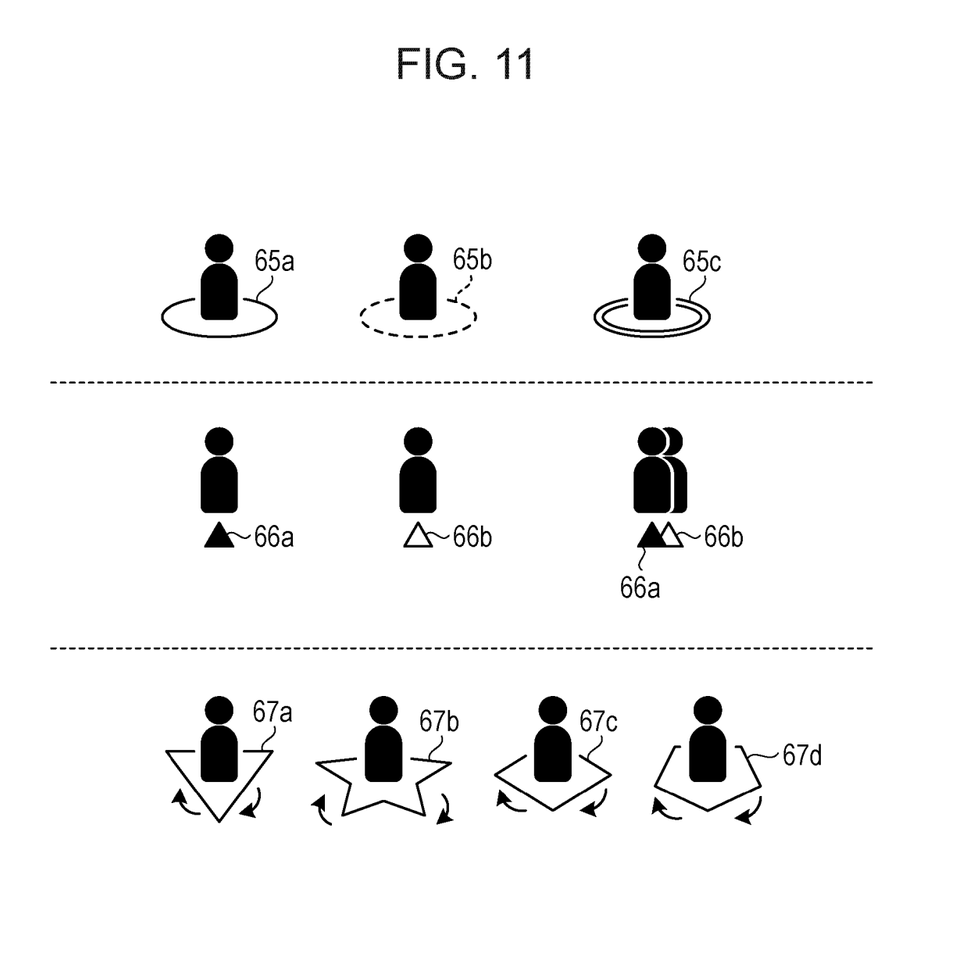
FIG. 11 illustrates an example of a pattern illustrating a position where an event occurs.

The other processing 3 performed by the display device 100 will be described. The display control unit 154 of the display device 100 displays the prediction circle at the position where the event occurs, but the configuration is not limited to the above. FIG. 11 illustrates an example of the pattern indicating the position where the event occurs.

As illustrated in FIG. 11, the pattern indicating the position where the event occurs may be a circle 65a, a dotted-line circle 65b, or a double-line circle 65c. Triangular marks 66a and 66b may also indicate the pattern where the event occurs. The triangular marks 66a and 66b have such a benefit that the mark is easily observed even when the player is overlapped with the mark. The pattern indicating the position where the event occurs may also be a tringle shape 67a, a star shape 67b, a diamond shape 67c, or a pentagonal shape 67d. Although the descriptions are omitted in the patterns of FIG. 11, colors of the patterns may also be changed.

The display control unit 154 displays the position where the event occurs on the display screen by using any one of the patterns illustrated in FIG. 11. The display control unit 154 may hold a table in which the event types are associated with the patterns and display the position where the event occurs by the pattern corresponding to the event type based on the above-mentioned table. The display control unit 154 may also display a pattern displayed for the offensive player and a pattern displayed for the defensive player while being distinguished from each other.

Figure 12:
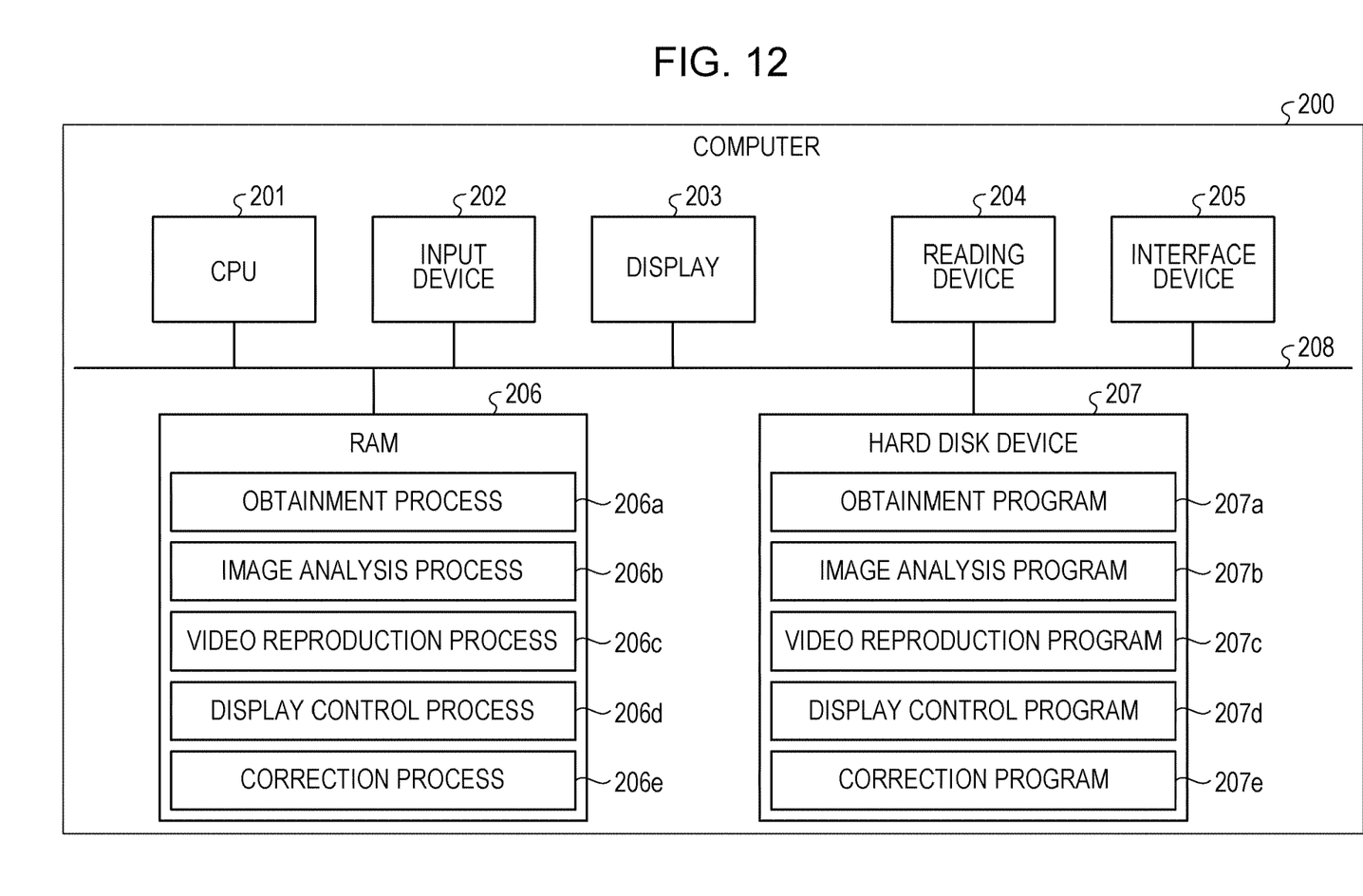
FIG. 12 illustrates an example of a hardware configuration of a computer that realizes a similar function to that of the display device.

Next, an example of a hardware configuration of a computer that realizes a function similar to that of the display device 100 according to the above-mentioned embodiment will be described. FIG. 12 illustrates the example of the hardware configuration of the computer that realizes the function similar to that of the display device.

As illustrated in FIG. 12, a computer 200 includes a central processing unit (CPU) 201 that executes various computation processes, an input device 202 that accepts an input of data from a user, and a display 203. The computer 200 also includes a reading device 204 that reads a program or the like from a storage medium and an interface device 205 that performs transmission and reception of data with a recording device or the like via a wired or wireless network. The computer 200 further includes a random access memory (RAM) 206 that temporarily stores various information and hard disk device 207. The respective devices 201 to 207 are coupled to a bus 208.

The hard disk device 207 includes an obtainment program 207a, an image analysis program 207b, a video reproduction program 207c, a display control program 207d, and a correction program 207e. The hard disk device 207 reads out the programs 207a to 207e to be developed into the RAM 206.

The obtainment program 207a functions as an obtainment process 206a. The image analysis program 207b functions as an image analysis process 206b. The video reproduction program 207c functions as a video reproduction process 206c. The display control program 207d functions as a display control process 206d. The correction program 207e functions as a correction process 206e.

The processing of the obtainment process 206a corresponds to the processing of the obtaining unit 151. The processing of the image analysis process 206b corresponds to the processing of the image analysis unit 152. The processing of the video reproduction process 206c corresponds to the processing of the video reproduction unit 153. The processing of the display control process 206d corresponds to the processing of the display control unit 154. The processing of the correction process 206e corresponds to the processing of the correction unit 155.

A configuration may be adopted in which the respective programs 207a to 207e are not stored in the hard disk device 207 from the start. For example, a "portable physical medium" such as a flexible disc (FD), a compact disc read only memory (CD-ROM), a digital versatile disc (DVD), an opto-magnetic disc, or an integrated circuit (IC) card inserted into the computer 200 previously stores the respective programs. The computer 200 may read out the respective programs 207a to 207e to be executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:

upon capture of video data for a match of a sport at a first time, performing detection of event information from the captured video data during a first time-period starting from the first time, the event information including information identifying an occurrence timing of an event that occurs in the match of the sport, an event type of the event, and an occurrence position of the event;

reproducing the video data, on a display screen, with a delay by a second time-period obtained by adding a third time-period longer than or equal to a predetermined time-period to the first time-period;

upon detection of the event information, continuing displaying the event type and area information indicating the occurrence position of the event, on the display screen, for the predetermined time-period, from a timing that is the predetermined time before the occurrence timing of the event within the reproduced video data; and adjusting, based on the event type, the third time-period to be added to the first time-period.

2. The non-transitory, computer-readable recording medium of claim 1, wherein the displaying includes displaying a pattern in accordance with the event type as the area information indicating the occurrence position of the event.

3. The non-transitory, computer-readable recording medium of claim 2, wherein the displaying includes changing a representation of the pattern in accordance with the event type as a time within the reproduced video data approaches the occurrence timing of the event.

4. A display method executed by a processor included in a display apparatus, the display method comprising:

upon capture of video data for a match of a sport at a first time, performing detection of event information from the captured video data during a first time-period starting from the first time, the event information including information identifying an occurrence timing of an event that occurs in the match of the sport, an event type of the event, and an occurrence position of the event;

reproducing the video data, on a display screen, with a delay by a second time-period obtained by adding a third time-period longer than or equal to a predetermined time-period to the first time-period;

upon detection of the event information, continuing displaying the event type and area information indicating the occurrence position of the event, on the display screen, for the predetermined time-period, from a timing that is the predetermined time before the occurrence timing of the event within the reproduced video data; and adjusting, based on the event type, the third time-period to be added to the first time-period.

5. The display method of claim 4, wherein the displaying includes displaying a pattern in accordance with the event type as the area information indicating the occurrence position of the event.

6. The display method of claim 5, wherein the displaying includes changing a representation of the pattern in accordance with the event type as a time within the reproduced video data approaches the occurrence timing of the event.

7. A display apparatus comprising:

a memory; and a processor coupled to the memory and configured to:

upon capture of video data for a match of a sport at a first time, perform detection of event information from the captured video data during a first time-period starting from the first time, the event information including information identifying an occurrence timing of an event that occurs in the match of the sport, an event type of the event, and an occurrence position of the event, reproduce the video data, on a display screen, with a delay by a second time-period obtained by adding a third time-period longer than or equal to a predetermined time-period to the first time-period, upon detection of the event information, continue displaying the event type and area information indicating the occurrence position of the event, on the display screen, for the predetermined time-period, from a timing that is the predetermined time before the occurrence timing of the event within the reproduced video data, and adjust, based on the event type, the third time-period to be added to the first time-period.

8. The display apparatus of claim 7, wherein
the displaying includes displaying a pattern in accordance with the event type as the area information indicating the occurrence position of the event.

9. The display apparatus of claim 8, wherein
the displaying includes changing a representation of the pattern in accordance with the event type as a time within the reproduced video data approaches the occurrence timing of the event.

* * * * *